US012138695B2

(12) United States Patent
Deeg et al.

(10) Patent No.: US 12,138,695 B2
(45) Date of Patent: Nov. 12, 2024

(54) REUSABLE GUIDE PLATE AND DRILLING TOOL WITH EXCHANGEABLE GUIDE PLATE

(71) Applicant: botek Präzisionsbohrtechnik GmbH, Riederich (DE)

(72) Inventors: Jürgen Deeg, Metzingen (DE); Patrick Kammerer, Nehren (DE); Stefan Piramovsky, Reutlingen (DE); Philipp Jakob, Herrenberg (DE)

(73) Assignee: botek Präzisionsbohrtechnik GmbH, Riederich (DE)

( * ) Notice: Subject to any disclaimer, the term of this patent is extended or adjusted under 35 U.S.C. 154(b) by 585 days.

(21) Appl. No.: 17/601,833

(22) PCT Filed: Mar. 11, 2020

(86) PCT No.: PCT/EP2020/056511
§ 371 (c)(1),
(2) Date: Oct. 6, 2021

(87) PCT Pub. No.: WO2020/207690
PCT Pub. Date: Oct. 15, 2020

(65) Prior Publication Data
US 2022/0168822 A1   Jun. 2, 2022

(30) Foreign Application Priority Data
Apr. 9, 2019   (DE) .................... 10 2019 109 256.6

(51) Int. Cl.
B23B 51/00   (2006.01)
B23B 51/06   (2006.01)

(52) U.S. Cl.
CPC ........ *B23B 51/063* (2022.01); *B23B 2251/56* (2013.01)

(58) Field of Classification Search
CPC ............ B23B 2229/04; B23B 2251/56; B23B 51/0054; Y10T 408/5586
See application file for complete search history.

(56) References Cited

U.S. PATENT DOCUMENTS

2016/0243627 A1\* 8/2016 Hansson ............. B23B 51/0493
2018/0236571 A1   8/2018 Hecht et al.

FOREIGN PATENT DOCUMENTS

| CN | 1156982 A | 8/1997 | |
|---|---|---|---|
| CN | 102470447 A | 5/2012 | |
| CN | 103596715 A | 2/2014 | |
| EP | 2862656 A1 \* | 4/2015 | ......... B23B 51/0493 |

OTHER PUBLICATIONS

Translated Chinese Notice of First Examination Action, App. No. 202080027318.2, dated Feb. 25, 2024, pp. 1-19.

\* cited by examiner

*Primary Examiner* — Alan Snyder
(74) *Attorney, Agent, or Firm* — George R. McGuire; Bond, Schoeneck & King PLLC

(57) ABSTRACT

An indexable guide plate and an associated drilling tool are described in which the indexable guide plates have very small dimensions but, despite these small dimensions, have a large number of guide surfaces. As a result, the indexable guide plate according to the invention can be used for a long time, even with drilling tools having a small drilling diameter.

16 Claims, 7 Drawing Sheets

Detail X

REUSABLE GUIDE PLATE AND DRILLING TOOL WITH EXCHANGEABLE GUIDE PLATE

CROSS REFERENCE TO RELATED APPLICATIONS

This is a national stage application filed under 37 U.S.C. 371 based on International Patent Application No. PCT/EP2020/056511, filed March 11 2020, which claims priority to German Patent Application No. 10 2019 109 256.6 filed on Apr. 9, 2019, the disclosures of which are incorporated herein by reference in their entireties.

BACKGROUND

The invention relates to a drilling tool comprising at least one exchangeable guide plate (hereinafter also referred to as an "indexable guide plate") for machining on drilling machines, lathes, machining centers and other machine tools, and also relates to the associated guide plate.

Drilling tools having indexable guide plates are available in a wide variety of designs. BTA drill heads, ejector drill heads, single-lip deep-drilling tools and double-lip deep-drilling tools are noted by way of example, but in a non-exhaustive manner.

The invention can be used in all types of drilling tools. In the following, for the sake of linguistic simplicity, reference is made simply to drilling tools; this means all types of drilling tools.

Drilling tools typically comprise a clamping end, a shank and a drill head. The clamping end, shank and drill head can be manufactured from one piece. It is also possible to solder, screw or otherwise connect the clamping end and/or the drill head to the shaft. The drilling tool then consists of multiple interconnected components.

Deep-drilling tools are characterized by the fact that they can be used to produce deep holes with a length-to-diameter ratio of $L/D \geq 10$. Length-to-diameter ratios of $L/D > 100$ can be achieved. These deep-drilling tools are usually single-edged tools. As a result, asymmetrical transverse forces act on the tool during the machining process. This requires guiding the drilling tool via a drill bush or pilot hole during spot drilling, but at the same time allows the tool to guide itself with high precision in the previously produced hole via guide surfaces in the region of the drill head at the front end of the tool. This allows the large drilling depths with a small shift, that is to say a small deviation of the center axis of the hole from the linear nominal path. In addition, the guide surfaces smooth the produced hole wall, due to the acting transverse forces, by leveling out small elevations and/or grooves of the hole.

The invention further relates to the geometric design of the indexable guide plate and the plate seat in the drilling tool for the indexable guide plate in order to realize a form-fitting and easily detachable connection between the indexable guide plate and the drilling tool.

Various terms from geometry are used to describe the connection according to the invention between the indexable guide plate and the drilling tool, and these are briefly defined below. These definitions correspond to the usual mathematical definitions, such as those found in the "Großes Handbuch der Mathematik," edited by W. Gellert, Dr. H. Küstner, Dr. M. Hellwich and H. Kästner, or on "Wikipedia."

Parallel planes: Two planes are parallel if they are at the same distance from one other at every point. Planes that are not spaced apart are therefore not parallel planes. The adjective "parallel" thus implies a distance between the planes.

Radial symmetry: Figures of which the points can be made to coincide by a plane rotation through an angle phi about a point S are referred to as being rotationally symmetrical. If the angle phi is equal to 180°, then this is known as a central symmetry. In the indexable guide plate according to the invention, the angle phi is equal to or less than 120°. The point S is the central point; in the indexable guide plate according to the invention, it is located in the longitudinal axis of the fastening hole.

WO 2012 172537 A1, WO 2014 104432 A1 and WO 2014 104431 A1 disclose indexable guide plates and drilling tools with detachably fastened indexable guide plates.

WO 2014 104431 A1 describes indexable guide plates having a cuboid outer contour. In this indexable guide plate, the support surface and the guide surfaces are arranged orthogonally to one another. Because of this geometry, it can be used only for tools with a relatively large drilling diameter.

WO 2012 172537 A1 and WO 2014 104432 A1 describe relatively delicate indexable guide plates having only two guide surfaces on one side. In these structures, due to the delicate design, the transmission of force between the drilling tool and the indexable guide plate is limited. If a guide surface is worn, the indexable guide plate must be turned 180°. If both guide surfaces on one side are worn, the indexable guide plate can be rotated 180° about its longitudinal axis.

SUMMARY OF THE INVENTION

The problem addressed by the invention is that of providing an indexable guide plate and a drilling tool comprising an indexable guide plate which overcome the disadvantages of the prior art. In particular, the indexable guide plate should be fastened in the drilling tool with high repeatability; it should be possible to reliably introduce large guide forces from the indexable guide plate into the drilling tool. Finally, the indexable guide plate should also be able to be used with drilling tools having a small drilling diameter. The "turning" and exchange of the indexable guide plate should also be possible in a simple and reliable manner under the conditions of large-scale industrial production.

This problem is solved according to the invention by an indexable guide plate for use in a drilling tool, the indexable guide plate having a support surface, multiple guide surfaces and a central fastening hole, the indexable guide plate being rotationally symmetrical with respect to a longitudinal axis of the fastening hole, and the support surface being flat.

One embodiment of the indexable guide plate according to the invention has two sides, an "underside" which is designed as a flat support surface and an "upper side" which is opposite the "underside" and on which multiple guide surfaces are provided.

The guide surfaces (usually three or four) take up all or almost all of the upper side of the indexable guide plate. They can be separated from one another by narrow, radially extending depressions. These radially extending depressions are used, similar to an undercut, to separate the guide surfaces from one another. This facilitates the grinding of the curved guide surfaces.

Because the guide surfaces take up (almost) the entire upper side of the indexable guide plate, the indexable guide plates can be relatively compact. They are therefore very robust and extremely resilient and can also be used with drilling tools having small drilling diameters. During drilling, the normal forces acting on the relevant active guide surface are transmitted directly to the support surface of the indexable guide plate. This in turn rests in a flat recess of a drilling tool, so that a very direct and therefore very resilient transmission of the normal forces between the active guide surface and the drilling tool takes place. The drilling tool is thus guided very well in the hole. This results in very good geometric properties of the hole and a very good service life of the cutting edge(s) of the drilling tool.

In an alternative embodiment of the indexable guide plate, it has two sides and a central fastening hole, with a support surface and multiple guide surfaces being formed on each side, the indexable guide plate being rotationally symmetrical with respect to a longitudinal axis of the fastening hole, the guide surfaces on one side of the indexable guide plate being separated from one another only by a radially extending depression, and a base of this depression being designed as a flat support surface.

Because both sides are identical in this embodiment, the distinction between the upper side and underside is possible only through the installation position of the indexable guide plate in the drilling tool, or functionally.

Because the base of the depressions is designed as a flat support surface, it is possible to form multiple guide surfaces and a support surface on each side of the indexable guide plate. The flat support surface on the "underside" of an indexable guide plate is active when a guide surface on the opposite "upper side" guides the drilling tool in the hole. When all of the guide surfaces on one side of the indexable guide plate are worn, the indexable guide plate is rotated so that the "upper side" and "underside" switch their positions. As a result, the number of guide surfaces and thus the service life of the indexable guide plate can be doubled!

The guide surfaces and the depressions on the upper side and the guide surfaces and the depressions on the underside are offset from one another; with three guide surfaces on each side, the offset is equal to 60°. With four guide surfaces on each side, the offset is equal to 45°.

It has proven to be advantageous if the depressions between the guide surfaces are T-shaped at their radially outer ends. It is then possible to transmit the normal forces acting on the relevant active guide surface even more effectively to the drilling tool via the optimized support surface on the underside and, with the same geometric dimensions, to further increase the load capacity of the indexable guide plate.

Both embodiments of the indexable guide plate according to the invention require very little space because of their planar structure and the effective utilization of the upper side, so that the indexable guide plates according to the invention can be used for drills having relatively small drilling diameters, for example 15 mm.

In a preferred embodiment, the indexable guide plate according to the invention has an outer contour in the shape of a hexagon or octagon. In the first embodiment according to FIG. 1, indexable guide plates having three or four guide surfaces can be implemented on one side. In the embodiment according to claim 2, six or eight guide surfaces can be implemented on an indexable guide plate.

In order for the relevant active guide surface to optimally transmit the normal forces to the hole wall, a longitudinal axis of the depressions and a radius beam directed from the central point to the corners of the outer contour enclose an angle α different from 0°. In the case of a hexagonal outer contour, this angle is usually equal to 60°. In the case of an octagonal outer contour, the angle α is equal to 45°.

This means that, in the region of the depressions between the guide surfaces, there is no contact between the hole wall and the indexable guide plates, but rather there is contact only in the region of the "active" guide surface. This ensures an optimal transmission of force between the hole and the guide surface. This has a positive effect on the quality of the holes and the service life of the drilling tool.

The guide surfaces according to the invention are generally curved. The guide surfaces are preferably designed as cylindrical surfaces, with a diameter of this cylindrical surface being slightly smaller than the diameter of the hole produced by the drilling tool and the indexable guide plate. In other words: The longitudinal axis of the cylindrical surface of the indexable guide plate and the longitudinal axis of the hole to be machined are not coaxial, but are slightly spaced apart from one another. The distance between said longitudinal axes can be, for example, one (1) millimeter, but also several millimeters.

In a development of the drilling tool according to the invention, the support surface for the indexable guide plate and the axis of the drilling tool enclose an angle of from 3° to 15°. The lower limit of this angle is 0°. In other words: a normal vector of the support surface and the axis of the drilling tool enclose an angle of from 75° to 87°. The angle is dimensioned so that only one guide surface of the indexable guide plate comes into contact with the hole in the workpiece. This guide surface is then "active"; the other guide surfaces are inactive. The inclination of the support surface is dimensioned such that the longitudinal axis of the cylindrical active guide surface of the indexable guide plate and the longitudinal axis of the drilling tool, as described above, enclose an angle beta which is greater than or equal to 0°.

Due to the rotationally symmetrical design of the indexable guide plate according to the invention, a worn guide surface can be deactivated and replaced with a new, unused guide surface by turning the indexable guide plate through an angle phi of 120° or 90°.

The indexable guide plates known from the prior art have only two guide surfaces on an upper side which is arranged opposite the support surface, so that it is necessary to turn the guide plate through 180°. In the indexable guide plate according to the invention, the angle phi is smaller and, accordingly, the number of guide surfaces is larger. This improves the efficiency of the indexable guide plate according to the invention.

The indexable guide plates according to the invention are made of a hard material, e.g. sintered carbide, cermet or ceramic, which can be provided with an additional hard material layer to extend the service life. If one of the guide surfaces is worn, a worn indexable guide plate can be rotated and turned so that a guide surface that has not yet been used is activated. Only when all guide surfaces are worn does the indexable guide plate have to be exchanged for a new, unused indexable guide plate.

The indexable guide plate on which the invention is based is used in a drilling tool having at least one exchangeable guide plate, comprising a shaft, with at least one recess for receiving an indexable guide plate according to any of the preceding claims being provided in the drill head and/or in the shaft, and a central threaded bore being present in the recess or recesses. With the help of the central threaded hole, an indexable guide plate according to the invention can be fastened in the recess and, if necessary, rotated or turned by loosening the fastening screw.

"Turning" in connection with the invention means that the indexable guide plate is rotated through the angle phi about a longitudinal axis of the central bore, so that a worn guide surface is deactivated and replaced with an unused guide surface.

"Rotating" in connection with the invention means that, in the embodiment according to claim 2, the "upper side" and the "underside" of an indexable guide plate switch their positions and functions.

In order to achieve an optimal contact pattern, the longitudinal axis of the cylindrical surface of the active guide surface and the longitudinal axis of the drilling tool enclose an angle beta that is greater than or equal to 0°. This angle can be, for example, 0°≤beta≤2°.

It has proven to be advantageous if the at least one recess is designed to be complementary to the outer contour of the indexable guide plates. This ensures a form-fitting connection between the indexable guide plates and the recesses. In order to be able to optimally transmit the radially acting forces from the drilling tool to the active guide surface and from there to the hole wall, a base of the recess is flat. It has also proven to be advantageous in the alternative embodiment if ribs extending in the radial direction are formed in the recess, and these ribs are complementary to the depressions of the indexable guide plate which extend in the radial direction.

This makes it possible to use the flat base of the depressions in the indexable guide plates according to claim 2 as a support surface. In this case, it is recommended that an upper side of the ribs is also a flat surface in order to maximize the contact surface between the indexable guide plate and the ribs.

The fact that the indexable guide plate rests on and is supported by the depressions also ensures that the radial distance between the active guide surface and the longitudinal axis of the tool remains constant over the entire service life of an indexable guide plate. If the indexable guide plate were to rest on the surface of the guide surfaces on the "underside" in the insert seat rather than via the depressions, this dimension would change as soon as the indexable guide plate is rotated, and then guide surfaces that have already been inserted and worn would serve as a support surface in the insert seat.

The transmission of radial forces from the drilling tool to the hole can be further improved in the alternative embodiment according to claim 2 if a strip is arranged orthogonally to one of the ribs and an upper side of the strip and the upper side of the ribs lie in one plane. This strip supports the indexable guide plate in the region of the active guide surface and thereby increases the load-bearing capacity and reliability of the indexable guide plate according to the invention.

In order to make space for the strip, in a particularly advantageous embodiment of the invention one of the ribs is shorter than the other ribs.

According to an advantageous development, an intermediate plate is provided which is flat on its underside and on the upper side of which the ribs and strips are formed. The underside of the intermediate plate then rests on a flat support surface of the drilling tool and its upper side provides a support surface for the indexable plate. This variant is advantageous in terms of production technology. If ribs or strips on the upper side become damaged, the damaged intermediate plate can easily be exchanged.

Further advantages and advantageous embodiments of the invention can be found in the following drawings, the description thereof and the claims. All of the features described in the drawings, the description thereof and the claims can be essential to the invention both individually and in any combination with one another.

DETAILED DESCRIPTION

As already mentioned at the outset, the invention relates to an indexable guide plate and an associated drilling tool. The invention is not limited to specific types of drilling tools. All drills, drilling tools and drill heads having exchangeable guide plates or guide pads can be equipped with the indexable guide plates according to the invention. In particular, the invention is suitable for use in BTA drill heads, in ejector drill heads, but also in single-lip drills and double-lip drills. The invention can in particular also be used on drilling tools for chambering holes. In short: The invention can be used on all drilling tools having guide plates or pads.

Because the invention relates to the guide plates or guide pads of drilling tools, the cutting edge geometry and other details of the drilling tools that are not essential to the invention will not be discussed. In connection with the invention, it is only important that a drill head is present which has one or more receptacles for the indexable guide plates according to the invention.

Figure 1:
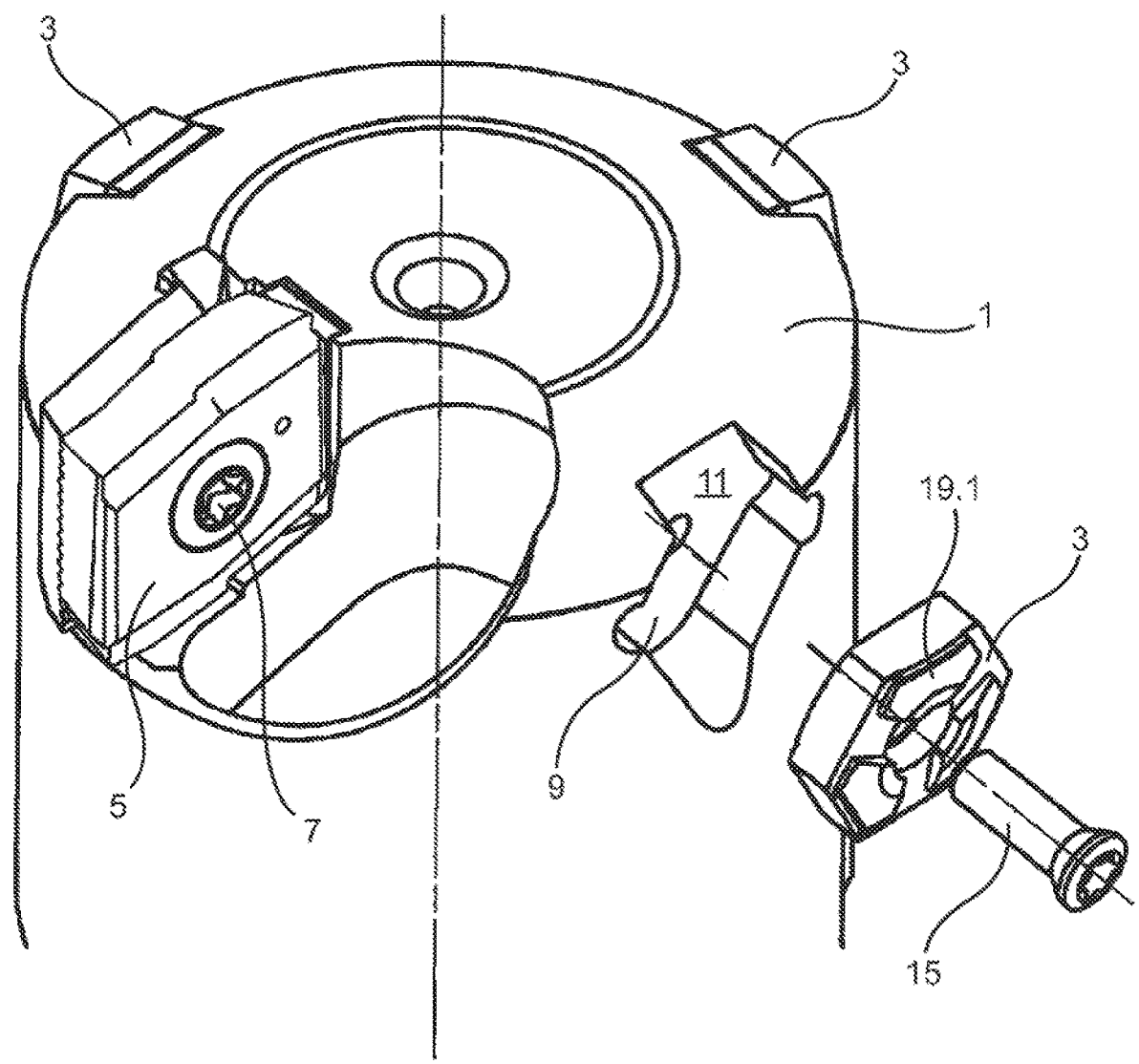
FIG. 1 is an exploded view of a counter boring head with a first embodiment of an indexable guide plate according to the invention.

FIG. 1 is an isomeric view of a counter boring head. The counter boring head comprises a drill head 1 and an insert 5 which is fastened in a suitably shaped pocket by means of a fastening screw 7. In this embodiment, three indexable guide plates 3 are arranged at the front end of the drill head 1 so as to be distributed over the circumference. One of the guide plates is shown in an exploded view in such a way that a recess 9 for receiving the indexable guide plate 3 can be seen. The recess 9 has a flat base 11. An internal thread 13 is provided approximately in the middle of the base 11. With the aid of a screw 15, which is screwed into the internal thread 13, the indexable guide plate 3 is fixed in the recess 9 and pressed against the base 11. The internal thread 13 can be positioned somewhat outside of the middle so that, when the screw 15 is tightened, the indexable guide plate 3 is pressed laterally against a wall of the recess 9.

Figure 2:
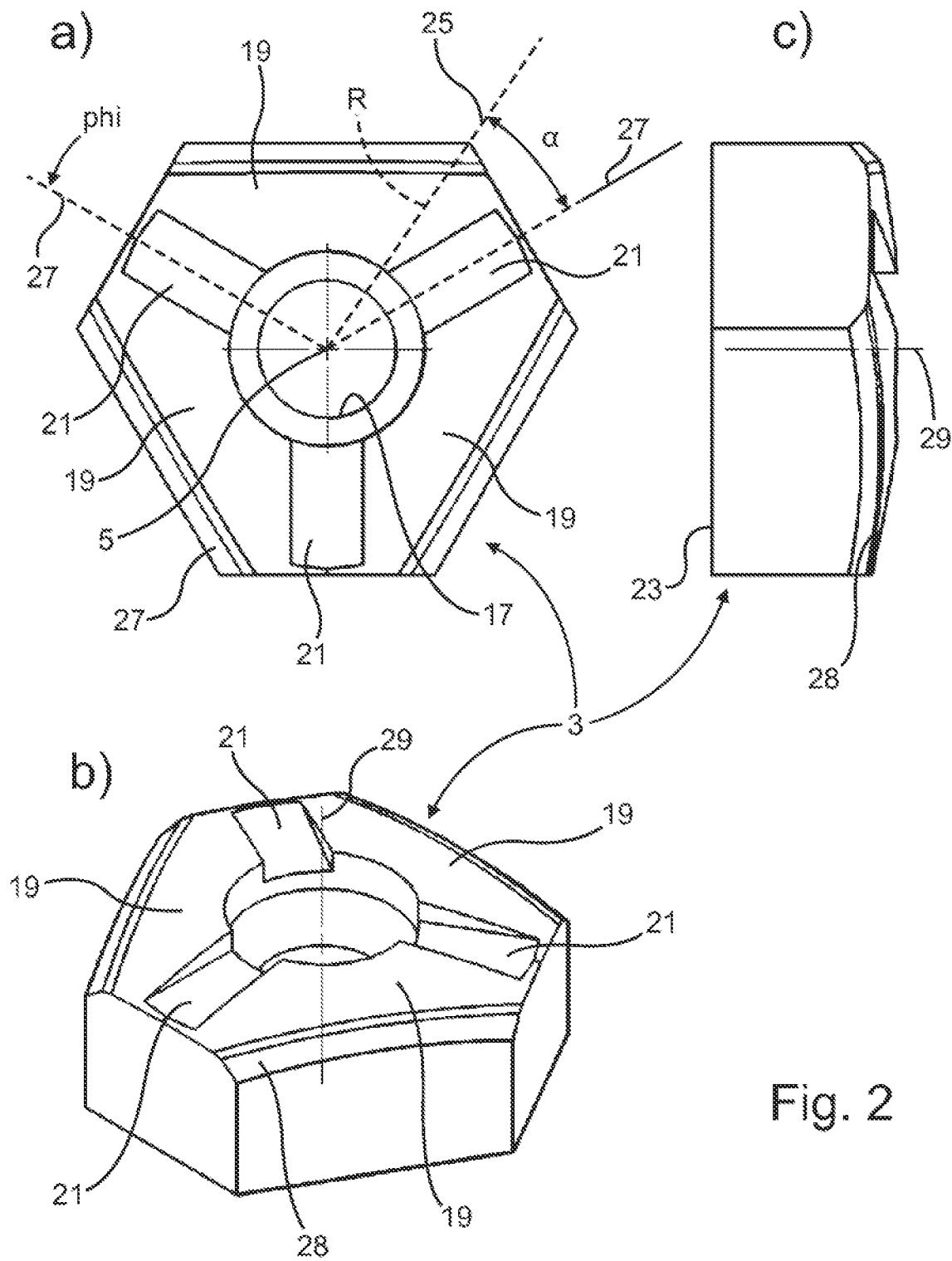
FIG. 2 a), b) and c) are different views of the first embodiment of an indexable guide plate.

FIG. 2 shows the indexable guide plate 3 in three different views (FIG. 2a: top view; FIG. 2b: isometric view; FIG. 2c: side view). On the basis of these views, the geometry and shape of a first embodiment of an indexable guide plate 3 according to the invention will be explained below.

As can be seen from the view from above (FIG. 2a), the indexable guide plate 3 is designed to be rotationally symmetrical. A central point S lies in a longitudinal axis of a central fastening hole 17, which is designed as a stepped hole. Because the screw 15 (see FIG. 1) has a countersunk head, the upper part of the fastening hole 17 is designed as a truncated cone.

In connection with the invention, for the sake of linguistic simplicity, the indexable guide plate 3 is associated with an underside and an upper side opposite the underside. The underside is the side of the indexable guide plate 3 which, in the installed state, rests on the base 11 of the recess 9. In this embodiment, three approximately triangular guide surfaces 19 are formed on the upper side. As can be clearly seen from the top view (FIG. 2a) and the isometric view (FIG. 2b), in this embodiment there are three radially extending depressions 21 between the guide surfaces 19. The guide surfaces 19 therefore do not merge directly into one another. This facilitates the production of the curved guide surfaces 19. However, a design without a depression between the guide surfaces 19 is also possible.

In this embodiment, the guide surfaces 19 have the shape of a cylinder, with the longitudinal axis of these cylindrical surfaces not extending in parallel with the underside of the indexable guide plate 3, but rising slightly inward, i.e. toward the fastening hole 17. The underside is the support surface 23 of the indexable guide plate 3 in the recess 9.

From the top view it is also clear that the indexable guide plate 3 has a hexagonal base, although in this embodiment it is not a regular hexagon with six edges of equal length. There are three longer edges and three shorter edges to prevent the indexable guide plate 3 from being installed incorrectly. The depressions 21 run toward the middle of the shorter edges. This situation can also be described in such a way that a radius R from the central point S to an edge 25 of the indexable guide plate 3 encloses an angle α which is different from zero with a longitudinal axis 27 of a depression 21. In the embodiment shown, this angle α is slightly smaller than 30°.

Because three guide surfaces 19 and three depressions 21 are arranged rotationally symmetrically in the embodiment shown in FIG. 2, the longitudinal axes 27 of two depressions 21 are each arranged so as to be rotated relative to one another through an angle phi of 120°. This means that, by turning the indexable guide plate 3 through 120° in the recess, a worn guide surface 19 can be replaced with an unused guide surface 19.

This becomes somewhat clearer when looking at FIG. 1. The guide surface designated by 19.1 is active when the indexable guide plate 3 is inserted into the recess 9 and the screw 15 is tightened. As soon as this guide surface 19.1 is worn out, the screw 15 is loosened, the indexable guide plate 3 is moved out of the recess 9, rotated through 120°, then reinserted into the recess 9 and fastened with the screw 15. The guide surface 19.1 is then no longer active and one of the other two guide surfaces 19 is active. This process can be repeated twice until all three guide surfaces 19 are worn. The indexable guide plate 3 can then no longer be used and must be replaced with a new indexable guide plate 3.

As can be seen from FIG. 2, chamfers 28 are formed on the outer edges of the guide surfaces 19. These chamfers 28 prevent the guide surfaces 19 from breaking out and are used as introductory chamfers when entering the produced hole or a spot-drilling guide in order to prevent jamming.

A longitudinal axis of the fastening hole 17 is designated by 29.

Returning to FIG. 1, it becomes clear that the recess 9 has a shape which corresponds to the hexagonal outer contour of the indexable guide plate 3. Undercuts are milled out at the corners. This ensures that there is no jamming between the edges of the indexable guide plate 3 and the complementary corners of the recess 9. In addition, it is ensured that the transmission of force between the drill head 1 and the indexable guide plate 3 takes place over the surface and not linearly in the region of the edges.

The recess 9 is open on the end face of the drill head 1. This makes it easier to insert and remove the indexable guide plate 3 from the recess. Otherwise it would often be difficult to remove the indexable guide plate 3 from the recess 9, since said plate is inserted into the recess 9 with little play.

Figure 3:
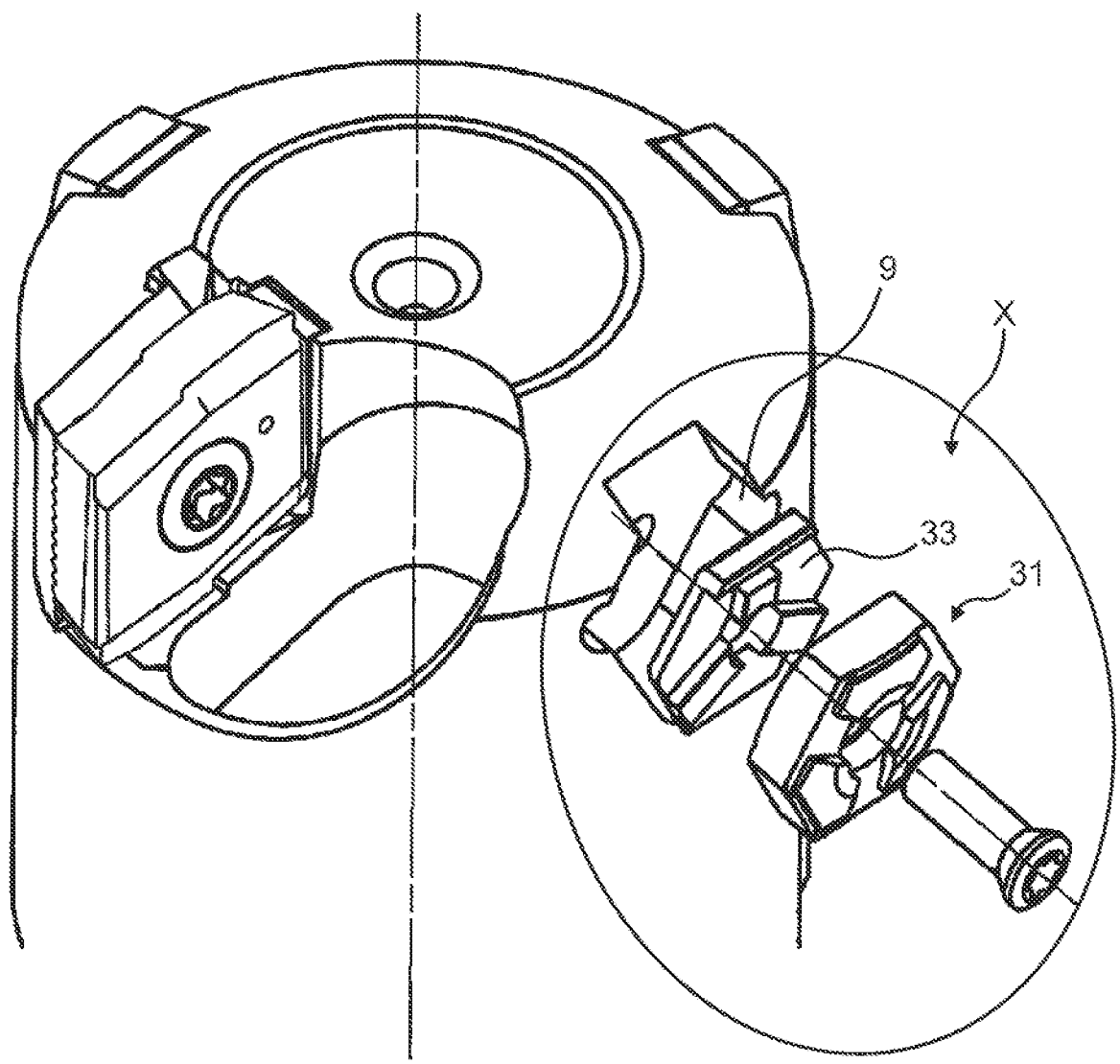
FIG. 3 is an exploded view of a drill head with a second embodiment of an indexable guide plate according to the invention.

FIG. 3 shows a drill head similar to that in FIG. 1. FIG. 3 is an exploded view of a second embodiment of an indexable guide plate 31 in conjunction with an intermediate piece 33. The indexable guide plate 31 and the intermediate piece 33 can be used as an alternative to the indexable guide plate 3 according to FIGS. 1 and 2. An important difference between the indexable guide plate 31 and the indexable guide plate 3 is that a total of six guide surfaces are formed here; three on the upper side and three on the underside.

Figure 4:
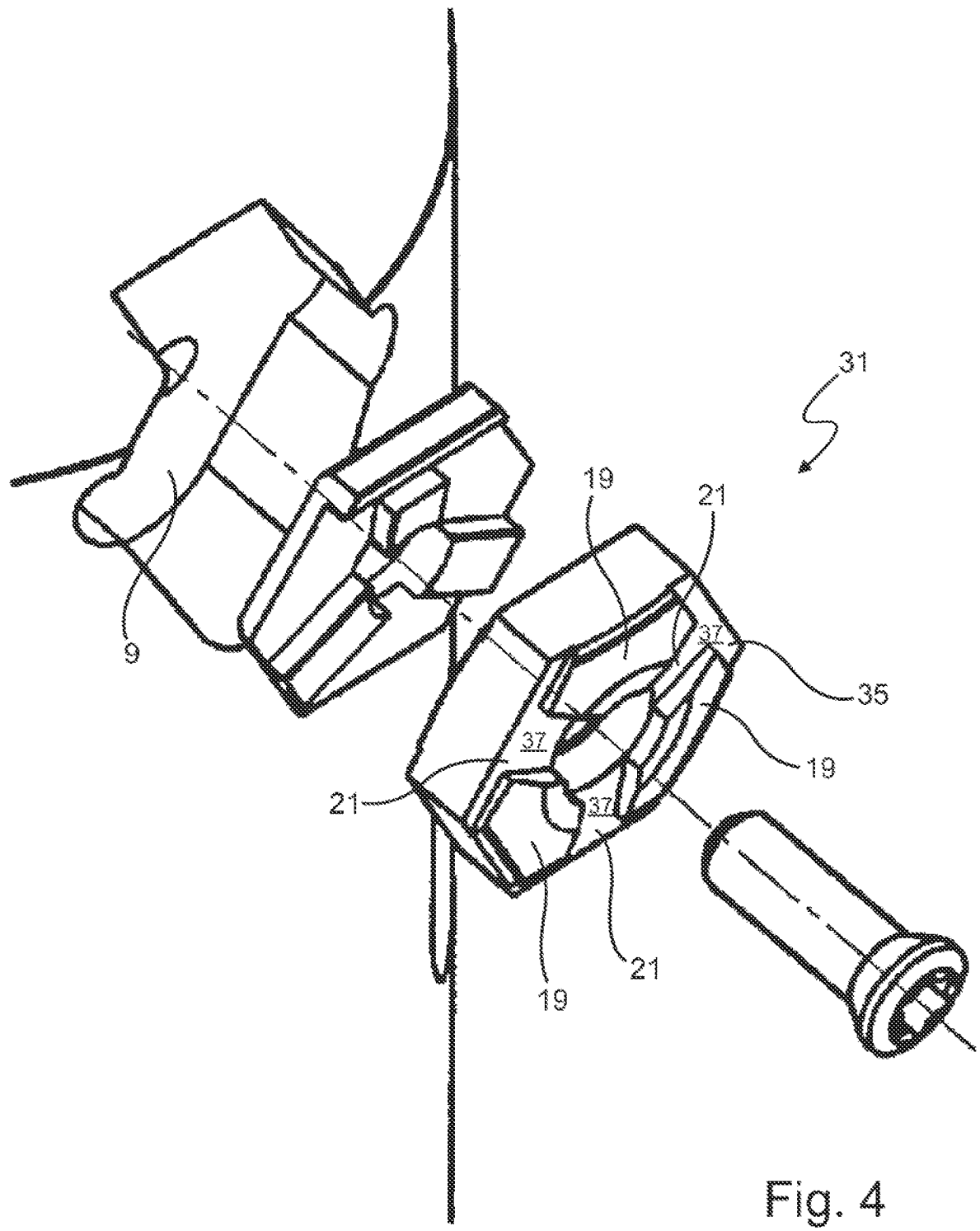
FIG. 4 shows a detail from FIG. 3.

FIG. 4 shows the detail X from FIG. 3 enlarged. The indexable guide plate 31 has an outer contour in the shape of a regular hexagon, so that all six edges are of the same length.

The upper side and underside of the indexable guide plate 31 are shaped the same. However, the depressions 21 on the upper side and the depressions 21 and the guide surfaces 19 on the underside (not visible) of the indexable guide plate 31 are arranged so as to be rotated with respect to one another through 60° (corresponding to an angle phi/2).

The detail X makes it clear that the depressions 21 are T-shaped at their radially outer end. The crossbar of this "T" extends in parallel with an edge of the indexable guide plate 31. One of the crossbars is identified in FIG. 4 with reference sign 35.

The bases of the T-shaped depressions 21 are flat, i.e. they lie in a common plane and form a support surface 37 which interacts with the intermediate piece 33.

Figure 5:
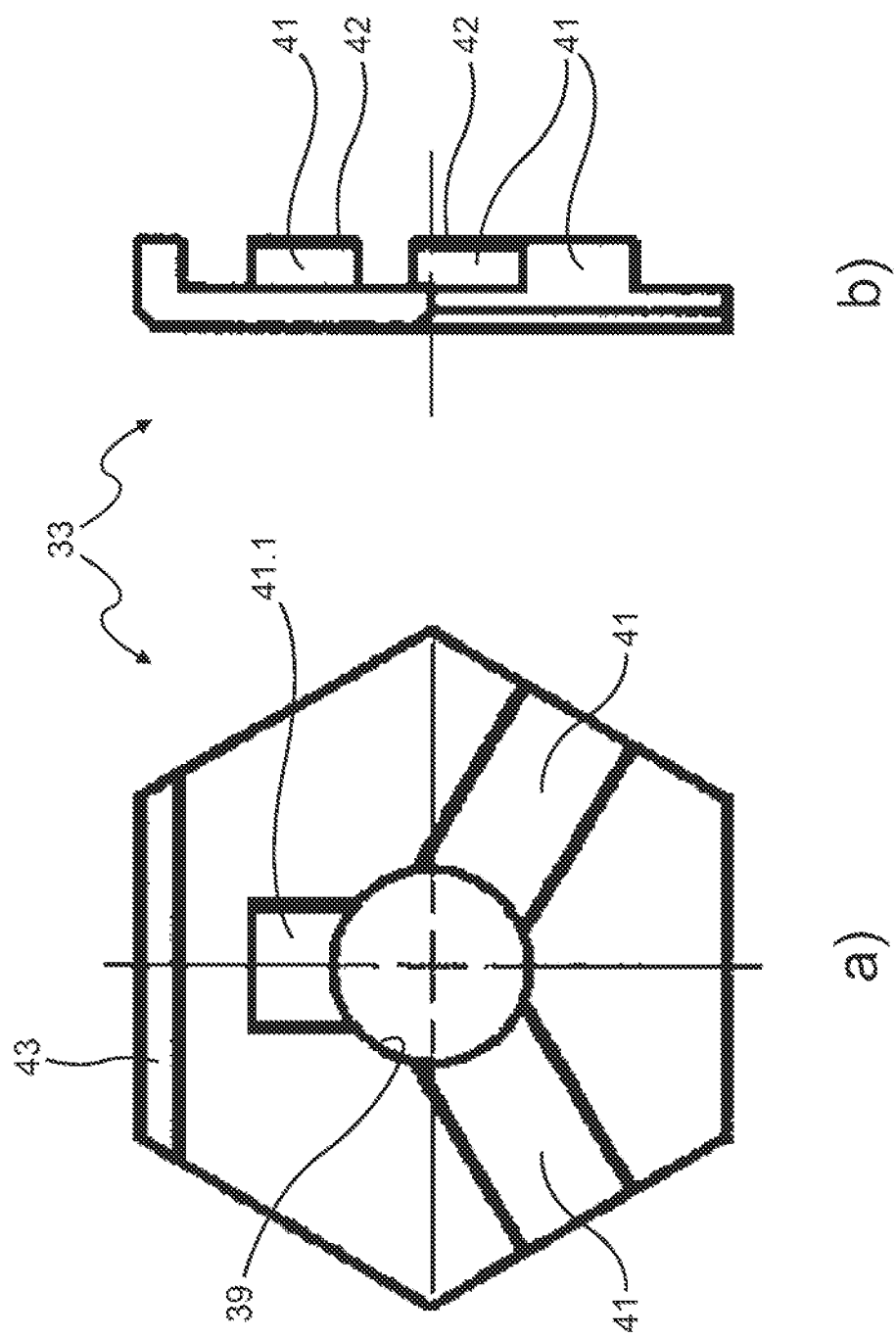
FIG. 5 a) and b) are two views of the intermediate plate according to the invention.

In FIG. 5, the intermediate piece 33 is shown in a view from above (FIG. 5a) and a side view (FIG. 5b). The intermediate piece 33 also has a hexagonal contour and a through-hole 39 in the middle. Three ribs 41 are formed on an upper side of the intermediate piece 33, corresponding to the number of depressions 21 in the indexable guide plate 31. One of the ribs 41.1 is shorter than the other two ribs 41. A strip 43 is formed orthogonally to this short rib 41.1 along the edge or the border of the intermediate piece 33. As can be seen from the side view in FIG. 5b, the upper sides 42 of the ribs 41 and the upper side of the strip 43 are arranged in one plane. They form the abutments for the support surfaces 37 at the base of the depressions 21 of the indexable guide plate 31.

One of the depressions 21 rests with its T-shaped crossbar 35 on the strip 43, so that the "active" guide surface 31 located there is optimally supported on the upper side.

As can be seen from FIGS. 3 and 4, the intermediate piece 33 is best inserted into the recess 9 in such a way that the strip 43 is positioned at the front end of the drill head 1. The guide surface 19 located there is active when the drill head is used. Via the crossbar 35 and the strip 43, the radial forces to be transmitted from the drill head 1 to the hole are transmitted in the best possible way and by the shortest route.

The strip 43 thus ensures that the active guide surface 19 is supported in the best possible way, although the contact surface between the indexable guide plate 31 and the intermediate piece 33 is smaller than the contact surface between the underside 23 of the indexable guide plate 3 and the base 11 according to the first embodiment.

Nevertheless, the indexable guide plate 31 according to the second embodiment can be loaded in the same way. The main advantage of the design according to the second embodiment of an indexable guide plate 31 can be seen in the fact that it has twice as many guide surfaces; in the case of a hexagonal outer contour, there are six guide surfaces. If the outer contour of the indexable guide plate is octagonal, then even eight guide surfaces can be integrated into one indexable guide plate.

Figure 6:
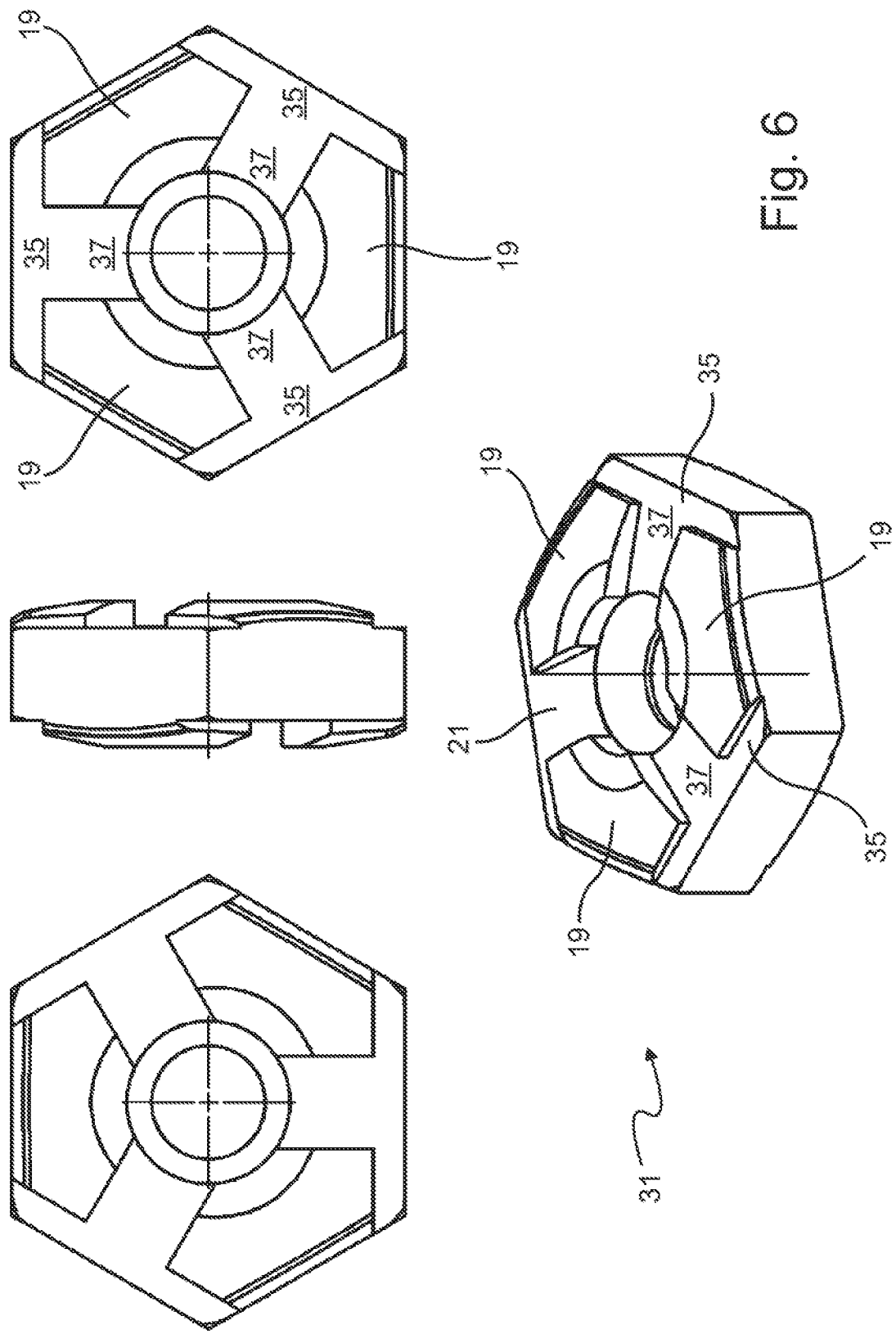
FIG. 6 shows different views of the second embodiment of an indexable guide plate 31 with six guide surfaces.

FIG. 6 shows different views of an indexable guide plate 31 according to the second embodiment in detail. This results in a very good geometry of the indexable guide plate according to the invention.

Figure 7:
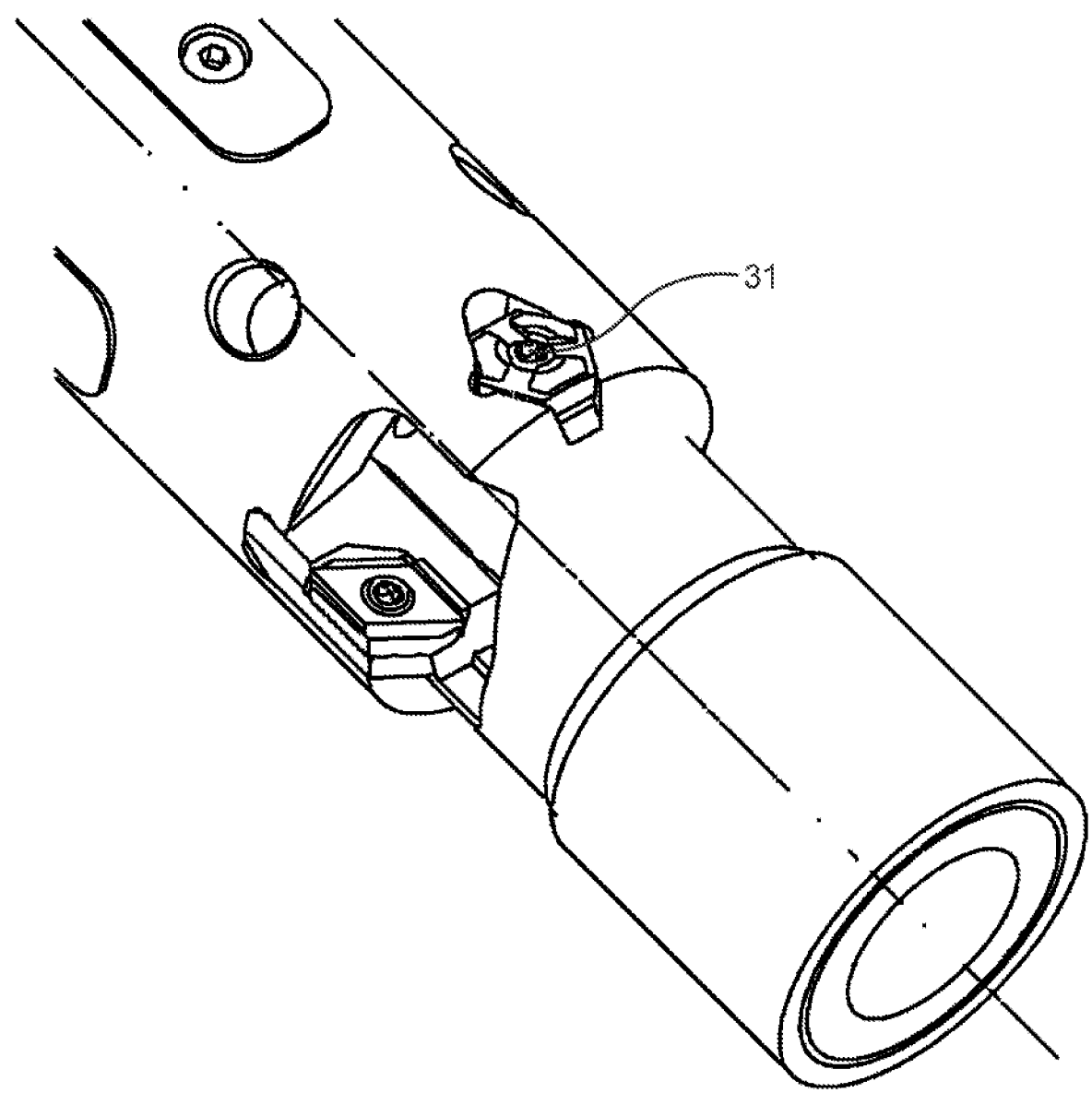
FIG. 7 shows a pull-boring head with indexable guide plates according to the invention.

FIG. 7 shows an example of a further drill head 1 in which the indexable guide plates 3 or 31 can be used.

LIST OF REFERENCE SIGNS 1 drill head
3 indexable guide plate
5 insert
7 fastening screw
9 recess
11 base
13 internal thread
15 screw
17 fastening hole (stepped hole)
19 guide surface
21 depression
23 underside of the indexable guide plate
25 corner of the indexable guide plate
27 longitudinal axis of the depression 21
28 chamfer
29 longitudinal axis of the fastening hole 17
31 indexable guide plate
33 intermediate piece
35 crossbar
37 support surface (at the base of the depressions 21)
39 hole
41 rib
42 upper side of rib 41 and strip 43
43 strip

The invention claimed is:

1. Indexable guide plate for use in a drilling tool, wherein the indexable guide plate has a support surface, multiple guide surfaces and a central fastening hole,
wherein the indexable guide plate is rotationally symmetrical with respect to a longitudinal axis of the fastening hole,
wherein the support surface is flat, characterized in that an outer contour of the indexable guide plate has the shape of a hexagon, and
wherein the hexagon has three longer edges and three shorter edges alternately.

2. Indexable guide plate according to claim 1, characterized in that the guide surfaces are curved.

3. Indexable guide plate according to claim 2, characterized in that the guide surfaces are designed as cylindrical surfaces, and in that a longitudinal axis of the cylindrical surface extends along the longitudinal axis of the drilling tool.

4. Indexable guide plate according to claim 1, characterized in that the longitudinal axis of a guide surface and the support surface enclose an angle of from 3° to 15°.

5. Indexable guide plate according to claim 1, characterized in that each guide surface can be made to coincide with another guide surface on a side of the indexable guide plate opposite the support surface by turning through an angle phi of 120° or 90°.

6. Indexable guide plate for use in a drilling tool, wherein the indexable guide plate has two sides and a central fastening hole, wherein a support surface and multiple guide surfaces are formed on each side,
wherein the indexable guide plate is rotationally symmetrical with respect to a longitudinal axis of the fastening hole,
wherein an outer contour of the indexable guide plate has the shape of a hexagon, and in that the hexagon has three longer edges and three shorter edges alternately,
wherein the guide surfaces on one side of the indexable guide plate are separated from one another only by radially extending depressions, and
wherein a base of these depressions is designed as a flat support surface, characterized in that the depressions are T-shaped at their radially outer ends.

7. Indexable guide plate according to claim 6, characterized in that a longitudinal axis of the depressions and a radius beam directed from the central point to the corners of the outer contour enclose an angle a different from zero degrees.

8. Drilling tool having at least one exchangeable guide plate, comprising a shaft, a clamping end, a drill head having at least one cutting edge and a longitudinal axis, wherein at least one recess for receiving an indexable guide plate,
wherein the indexable guide plate has a support surface, multiple guide surfaces and a central fastening hole,
wherein the indexable guide plate is rotationally symmetrical with respect to a longitudinal axis of the fastening hole,
wherein the support surface is flat, characterized in that an outer contour of the indexable guide plate has the shape of a hexagon,
wherein the hexagon has three longer edges and three shorter edges alternately, and
wherein the indexable guide plate is provided in the drill head and/or in the shaft, and wherein an at least approximately central threaded bore having an internal thread is present in the recess or recesses, characterized in that the shape of the at least one recess corresponds to the hexagonal outer contour of the indexable guide plate, and in that undercuts are milled out at the corners.

9. Drilling tool according to claim 8, characterized in that a base of the at least one recess is flat, in that ribs extending in the radial direction are formed in the at least one recess, in that these ribs are complementary to depressions of the indexable guide plate which extend in the radial direction, and in that an upper side of the ribs is flat, and in that the upper sides lie in one plane.

10. Drilling tool according to claim 9, characterized in that a strip is arranged orthogonally to one of the ribs, and in that an upper side of the strip and the upper sides of the ribs lie in one plane.

11. Drilling tool according to claim 9, characterized in that one of the ribs is shorter than the other ribs.

12. Drilling tool according to claim 8, characterized in that the at least one recess is designed to be complementary to an outer contour of the indexable guide plates.

13. Drilling tool according to claim 8, characterized in that the longitudinal axis of the cylindrical surface of an indexable guide plate and the longitudinal axis of the drilling tool enclose an angle less than or equal to 2°.

14. Drilling tool according to claim 8, characterized in that the support surface of the indexable guide plate and the axis of the drilling tool enclose an angle of from 3° to 15°.

15. Drilling tool according to claim 8, characterized in that it is a single-lip deep-hole drill or a double-lip deep-hole drill.

16. Drilling tool having at least one exchangeable guide plate, comprising a shaft, a clamping end, a drill head having at least one cutting edge and a longitudinal axis, wherein at least one recess for receiving an indexable guide plate, wherein the indexable guide plate has a support surface, multiple guide surfaces and a central fastening hole, wherein the indexable guide plate is rotationally symmetrical with respect to a longitudinal axis of the fastening hole, wherein the support surface is flat, characterized in that an outer contour of the indexable guide plate has the shape of a hexagon, wherein the hexagon has three longer edges and three shorter edges alternately, and wherein the indexable guide is provided in the drill head and/or in the shaft, and an at least approximately central threaded bore having an internal thread is present in the recess or recesses, characterized in that a base of the at least one recess is flat, and in that an intermediate piece is arranged in the recess, an outer contour of the intermediate piece corresponds to the outer contour of an indexable guide plate, in that an underside of the intermediate piece is flat, and in that ribs extending in the radial direction are formed on the upper side of the intermediate piece, in that these ribs are complementary to depressions of the indexable guide plate which extend in the radial direction, in that an upper side of the ribs is flat, and in that the upper sides lie in one plane.

\* \* \* \* \*